United States Patent [19]

Bonitz et al.

[11] 4,444,042
[45] Apr. 24, 1984

[54] ENGINE-KNOCK DETECTION METHOD AND APPARATUS

[75] Inventors: Jörg Bonitz, Mühlacker; Robert Entenmann, Benningen; Rochus Knab, Kornwestheim; Siegfried Rohde, Schwieberdingen; Herbert Schramm, Stuttgart, all of Fed. Rep. of Germany

[73] Assignee: Robert Bosch GmbH, Stuttgart, Fed. Rep. of Germany

[21] Appl. No.: 294,513

[22] Filed: Aug. 20, 1981

[30] Foreign Application Priority Data

Aug. 21, 1980 [DE] Fed. Rep. of Germany ....... 3031511

[51] Int. Cl.$^3$ .............................................. G01L 23/22
[52] U.S. Cl. ...................................................... 73/35
[58] Field of Search .................... 73/35; 123/425, 435

[56] References Cited

U.S. PATENT DOCUMENTS

| 3,218,843 | 11/1965 | Lindsey | 73/35 |
| 3,678,732 | 7/1972 | Arrigoni et al. | 73/35 |
| 4,276,861 | 7/1981 | Kearney et al. | 123/425 |
| 4,337,642 | 7/1982 | Yoshida | 73/35 |
| 4,344,318 | 8/1982 | Düdeck et al. | 73/35 |
| 4,346,586 | 8/1982 | Furrey | 73/35 |

Primary Examiner—Gerald Goldberg
Assistant Examiner—John E. Chapman, Jr.
Attorney, Agent, or Firm—Frishauf, Holtz, Goodman & Woodward

[57] ABSTRACT

An amplitude envelope signal is derived from the output of an engine-knock sensor. Either the peak value of the envelope signal or its steepest rate of rise initiates the operation of a delay circuit providing a signal after a delay that is dependent upon the magnitude of the peak value or rate of rise. The envelope signal is also compared with a reference signal responsive to or representing or simulating background noise levels, and a comparison signal is produced when the envelope signal exceeds the reference signal. Engine-knock recognition is determined by the coincidence of the comparison signal and the delayed signal, and may be subjected also to a measurement window criterion which limits the appearance of an engine-knock signal to a particular arc of crankshaft revolution.

6 Claims, 3 Drawing Figures

ENGINE-KNOCK DETECTION METHOD AND APPARATUS

This invention concerns the detection of engine-knock of an internal combustion engine by comparing mechanical vibrations sensed at an engine location known to respond to engine-knock vibrations with mechanical vibrations sensed at an engine location known to be relatively insensitive to engine-knock vibrations.

BACKGROUND OF THE INVENTION

It is known that under certain operating conditions of an internal combustion engine so-called engine knocking can occur. By engine knock is understood the occurrence of shock waves of the fuel-air mixture that are detectable as sound frequency oscillations of the motor, as well as in other ways. Since a heavy thermal loading of the combustion chamber side of the cylinder walls and of the piston usually takes place when there is engine knocking, such that material erosion can occur, efforts are made to avoid knocking, especially since long-repeated knocking can lead to breakdown of the engine. Since, on the other hand, efforts are made to utilize as widely as possible the existing working range of the internal combustion engine, there is a need for detecting knocking of the engine as early and as reliably as possible.

Along with the problem of providing a response to engine knock for detection purposes with a suitable transducer appropriately located, there is also the measurement technology problem of reliably and without interference fishing out the knock signal from the vibrations of the engine picked up by the sensor, in order to provide appropriate control of the engine in dependence upon a knock-detection signal that clearly designates either "knock present" or "knock absent."

A knock detector is disclosed in U.S. Pat. No. 3,440,262 in which the measured knock signal is compared with a predetermined threshhold value signal independent of the motor signal, with a knock recognition signal being provided when the knock signal oversteps the threshhold value. This device has the disadvantage that no knock recognition is produced with reference to the background noise of the engine, but merely by camparison with an external signal independent of the motor.

In U.S. Pat. No. 4,012,942 a knock detector is described in which the measured knock signal is compared with a reference signal that is generated by means of a function generator in response to engine speed. This method has the disadvantage that again the background noise actually occurring in the engine is not taken into account, but merely simulated by a function generator. Furthermore, since the function generator responds merely to engine speed, there is no taking account of the particular manner of operation at the time, the engine control setting and the aging effects which have affected the engine condition progressively.

Finally in German published patent application (OS) No. 29 16 591, a method of determining engine-knock is disclosed in which the peak value of the knock signal is monitored and is set in reference with the preceding peak value that was detected. Furthermore, a provision, among others, is made for performing the measurement only during a so-called measurement window, i.e. during an interval correlated to a particular angular range of the rotation of the crankshaft.

The above-mentioned devices and methods have the disadvantage, however, that extraneous noise in the neighborhood that has nothing to do with engine-knock are not always reliably excluded so that a falsification of the measurement results can take place. This applies particularly for interfering signals that occur by so-called piston bucking and as a result, the amplitude of these interfering signals can provide a substantial covering up of the knock signals.

THE INVENTION

It is an object of the invention to provide a method of detecting engine-knock that will to a large extent exclude the interference of vibrations due due to piston bucking. Briefly, a signal in response to the output of a mechanical vibration sensor at an engine-knock sensitive location is passed on as a knock recognition signal only if it remains present for an interval following a maximum characteristic value of the signal, which interval depends upon the magnitude of the maximum characteristic value. More particularly, an amplitude envelope signal is derived from the sensor signal by rectification and low-pass filtering and a maximum characteristic thereof, either the peak amplitude or the maximum steepness thereof, is detected and a delayed signal is produced that follows the peak value or maximum rate of rise by a time delay dependent upon its magnitude. The envelope signal is also compared with a reference signal, which may be a background noise signal from a location believed to be insensitive to knock vibrations, but which may be any heretofore used kind of reference signal, and a comparison result signal is provided when the envelope signal exceeds the reference signal. Finally a coincidence signal is produced when the delayed signal and the comparison result signal are coincident.

The invention has the advantage that the provision of a time criterion for the duration of the knock signal that depends upon some maximum characteristic of the knock signal, such as the peak value or the maximum steepness, provides reliable elimination of disturbing signals and thereby engine-knock recognition is made more sure in operation. In a preferred form of the invention a reference mark signal is also produced when the crankshaft of the engine passes through a predetermined rotary position and a second coincidence signal is then produced when the first coincidence signal and the reference mark signal are coincident.

THE DRAWING

The invention is further described with reference to the annexed drawing, in which.

DESCRIPTION OF THE ILLUSTRATED EMBODIMENT

Figure 1:
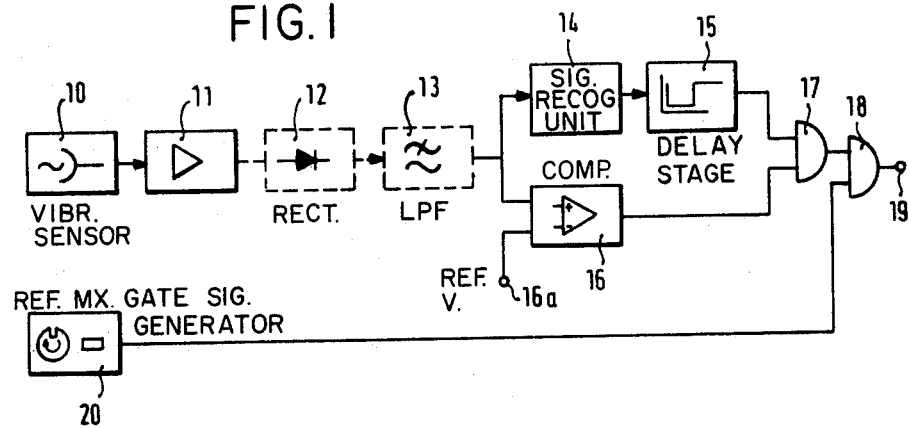
FIG. 1 is a block diagram of an embodiment of an apparatus according to the invention.

In the measurement of engine-knock usually sensors are provided which respond to engine vibrations. These sensors or transducers are designed for the known audible knock frequencies or a multiple thereof, so that the occurrence of a vibration in this frequency range is already a first indication of the occurrence of knocking. Since other vibrations (background noise) occurring in normal operation of an internal combustion engine appear in a wide frequency range, there is no frequency range in which only knock vibrations appear. There is accordingly the problem of separating the actual useful signal (knock signal) from background noise. For this purpose it is known to use a reference signal of an absolute magnitude or a reference signal derived from engine vibrations that lie in a frequency region in which few or hardly any knock components occur. If the useful signal and the reference signal are now compared, it is possible to provide a further criterion for the occurrence of knocking, by determining whether the useful signal is substantially greater than the reference signal.

It has now been found that in the case of piston-bucking signal interference, substantial amplitudes appear which are superimposed upon the useful signal. These interfering signals have a relatively short duration in time, however. This fact is utilized by the method of the invention by providing that the knock recognition obtained by comparison of the useful signal and the reference signal will be passed on towards an output only when the comparison result signal persists longer than a time interval the length of which, in accordance with the invention, can be made to depend upon the useful signal itself.

In a first embodiment of the method of the invention the peak value of the useful signal is determined in a known manner, such as by use of a peak-detector, and the time interval is defined so that it varies in magnitude in the same sense as the peak value. In another embodiment of the invention, instead of the peak value being the useful signal, its maximum steepness, i.e. rate of rise, is measured and the time interval is determined from the value of this maximum steepness. It goes practically without saying that the reference signal can be obtained in one of the known ways, thus either as a predetermined fixed value, as a value formed in a manner dependent upon the engine speed, or formed from the useful signal itself, for example by means of a low-pass filter of high time constant. It is also possible to perfect the method of the invention further by also bringing in as a further criterion the so-called measurement window, that is, to provide that the above-described measurement will be performed only during a time interval that is correlated to a particular angular region rotation of the crankshaft.

In the drawing there is shown an embodiment of an apparatus according to the invention. The sensor 10 is a known sensor for response to the knock vibrations of the engine and provides an output signal to an amplifier 11, which supplies a signal to the rectifier 12, the output of which is fed through a low-pass filter 13 to two separate circuit branches. The first branch consists of a signal recognition unit 14, the effect of which is further described below, and the output signal which is supplied to a variable delay stage 15. The second branch consists of a comparator 16, having a further input through a terminal 16a, to which the reference signal is applied. The generation of the reference signal can, as above mentioned, be performed in various known ways, and in order to simplify the representation the apparatus for generating the reference signal is not shown in the drawing. The outputs of the two branches, that is, of the delay stage 15 and the comparator 16, are applied to the inputs of an AND-gate 17, the output of which is connected to an input of a second AND-gate 18, the other input of which is coupled to the output of a reference mark transducer 20 responsive to the passage of the crankshaft through a particular angular position. The output of the second AND-gate 18 is finally supplied to an output terminal 19, from which it can be made available to a warning device or an automatic control system.

Figure 2:
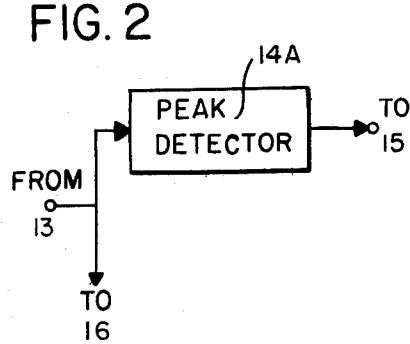
FIG. 2 shows a first embodiment of circuit block 14 of FIG. 1.
Figure 3:
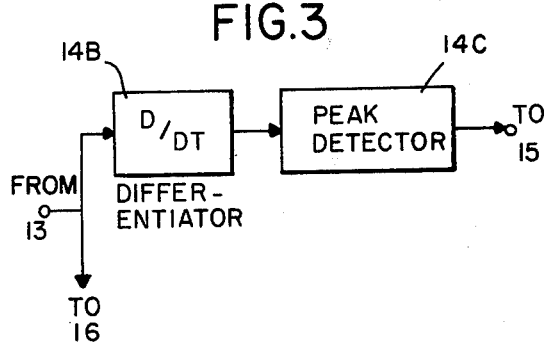
FIG. 3 shows a second embodiment of block 14 of FIG. 1.

The manner of operation of the apparatus shown in the drawing is as follows. The signals of the sensor 10 are amplified in the amplifier 11 and rectified in the rectifier 12. The low-pass filter 13 forms the envelope curve of the rectified signal, and the signal so produced is supplied to the signal recognition unit 14 and the comparator 16. In a first embodiment of the invention, as shown in FIG. 2, the peak value is determined in the signal recognition unit 14A and this peak value is then supplied to a variable delay stage 15. In another embodiment of the invention, as shown in FIG. 3, the steepness of the envelope signal is produced as an output of a differentiating circuit 14B. The maximum steepness of rise of the envelope signal is then detected by the peak detector 14C, after which the value of this maximum steepness is supplied to the variable delay stage 15. In both cases the variable delay stage 15 produces a logic 0 signal the time duration of which depends upon the amplitude of the signal applied to the input of this stage. This can, for example, be provided in analog circuit technology by charging a capacitor with a voltage the amplitude of which depends upon the measured peak value or maximum steepness. The capacitor is thereafter slowly discharged in a defined way, while a threshold voltage is provided so that the desired time interval begins with the charging of the capacitor in response to occurrence of the peak value or maximum steepness value and continues longer the greater the value is. In a corresponding way in digital circuit technology, a counter is provided in the delay stage 15 which is set in dependence upon the input value and is counted down in a predetermined manner until a predetermined count condition is reached. Also in this case the time interval is to be begun with the appearance of the maximum characteristic value and the time interval becomes, as a result of the length of the counting down, the longer, the greater the applied control value is. After the lapse of the time interval determined by the delay stage 15, the AND-gate 17 operating as a gate circuit is open, so that the comparison result signal formed at the output of the comparator 16 can be supplied for further processing provided that it continues at least until the moment at which the AND-gate 17 is opened. In this manner the overall result is obtained that any brief rise and fall of the envelope signal does not produce an output of gate 17. A further limitation of the measurement process in the apparatus shown in the drawing is obtained by providing another gate in the form of a second AND-gate 18 which is opened only during a particular measurement window period.

Although the invention has been described in reference to a particular illustrative embodiment, it will be understood that variations and modifications are possible within the inventive concept.

We claim:
1. Method of detecting-engine knock of an internal combustion engine having a crankshaft and an engine block, the said method comprising steps of:
converting mechanical vibrations occurring at an engine-knock sensitive location of an internal combustion engine into electrical signals;
deriving from said signals an amplitude envelope signal by rectification and filtering;

deriving from said envelope signal, by means of a peak detector, a value of a maximum characteristic of said envelope signal;

producing a delayed signal having a leading edge delayed with respect to the occurrence of said maximum characteristic by a delay dependent in magnitude upon the value of said maximum characteristic;

comparing said envelope signal with a reference signal to provide a comparison result signal when said envelope signal exceeds said reference signal in magnitude;

producing a first coincidence signal when said delayed signal and said comparison result signal occur at the same time; and utilizing said first coincidence signal to indicate engine knock.

2. Method as defined in claim 1 in which, in said step of deriving from said envelope signal value of a maximum characteristic of said envelope signal, said envelope signal is differentiated before being supplied to said peak detector, whereby the output of said peak detector indicates the maximum steepness of said envelope signal, and said delayed signal is produced so as to have a leading edge delayed with respect to the occurrence of said maximum steepness by a delay proportional to the value of said maximum steepness.

3. Method as defined in claim 1 or claim 2 wherein said step of utilizing said first coincidence signal comprises:

producing a reference mark signal when the crankshaft of said engine passes through a predetermined rotary position with respect to said engine block; and producing a second coincidence signal when said first coincidence signal and said reference mark signal are present at the same time, for use of said second coincidence signal as an engine-knock indication signal.

4. Apparatus for detecting engine-knock of an internal combustion engine having a crankshaft and an engine block, said apparatus further comprising means for converting mechanical vibrations occurring at an engine-knock sensitive location of said engine block into electrical signals;

amplifying, rectifying and low-pass filtering means connected to and responsive to said converting means and for deriving an amplitude envelope signal from said electrical signals;

means including a peak detector for deriving a value of a maximum characteristic of said envelope signal;

means connected to and responsive to the output of said peak detector for producing a delayed signal occurring later than the occurrence of said maximum characteristic by a delay proportional to said value of said maximum characteristic;

means for comparing said envelope signal with a reference signal and for providing a comparison result signal when said envelope signal exceeds said reference signal in magnitude;

means for producing a coincidence signal when said delayed signal and said comparison result signal occur at the same time; and means for producing an engine-knock signal utilizing said coincidence signal.

5. Apparatus as defined in claim 4 in which a signal differentiating circuit is interposed between said filtering means and said peak detector for supplying to said peak detector a signal representative of the maximum steepness of said envelope signal.

6. Apparatus as defined in claim 4 or claim 5 wherein said means for producing an engine-knock signal comprises means for producing a reference mark signal when the crankshaft of said engine passes through a predetermined rotary position with respect to said engine block; and means for producing an output signal for use as an engine-knock indication signal when said coincidence signal and said reference mark signal occur at the same time.

* * * * *